United States Patent
Starkey

(10) Patent No.: US 10,696,236 B1
(45) Date of Patent: Jun. 30, 2020

(54) TAILGATE PROTECTION PAD SYSTEMS

(71) Applicant: Jeremiah J. Starkey, Glenwood Springs, CO (US)

(72) Inventor: Jeremiah J. Starkey, Glenwood Springs, CO (US)

(*) Notice: Subject to any disclaimer, the term of this patent is extended or adjusted under 35 U.S.C. 154(b) by 29 days.

(21) Appl. No.: 16/240,508

(22) Filed: Jan. 4, 2019

(51) Int. Cl.
| | |
|---|---|
| *B60R 9/08* | (2006.01) |
| *B60R 13/01* | (2006.01) |
| *B62D 33/023* | (2006.01) |
| *B62D 33/027* | (2006.01) |
| *B62D 33/03* | (2006.01) |
| *B60R 9/00* | (2006.01) |
| *B60P 7/08* | (2006.01) |

(52) U.S. Cl.
CPC .............. *B60R 9/08* (2013.01); *B60P 7/0823* (2013.01); *B60R 9/00* (2013.01); *B60R 13/01* (2013.01); *B62D 33/023* (2013.01); *B62D 33/0273* (2013.01); *B62D 33/03* (2013.01)

(58) Field of Classification Search
CPC .. B60P 7/06; B60P 7/0823; B60P 7/16; B60R 9/00; B60R 9/06; B60R 9/08; B60R 13/01; B62D 33/023; B62D 33/027; B62D 33/0273; B62D 33/03
USPC ................................ 296/39.1, 39.2, 50, 57.1
See application file for complete search history.

(56) References Cited

U.S. PATENT DOCUMENTS

| | | | | |
|---|---|---|---|---|
| 5,456,398 | A * | 10/1995 | Allen | B60R 9/06 224/329 |
| D381,940 | S * | 8/1997 | Burton | D12/96 |
| 6,286,885 | B1 * | 9/2001 | Ramos | B60R 13/01 296/136.07 |
| 7,513,726 | B1 * | 4/2009 | Comiskey, Jr. | B60P 3/40 296/3 |
| 8,061,761 | B1 * | 11/2011 | Sierra | B60J 11/06 296/136.01 |
| 9,522,767 | B1 * | 12/2016 | Pass | G09F 21/04 |
| 10,300,861 | B1 * | 5/2019 | Green | B60R 7/02 |
| 2003/0129038 | A1 * | 7/2003 | Addy | B60P 3/40 410/97 |
| 2019/0366945 | A1 * | 12/2019 | Campbell | B60R 13/04 |

* cited by examiner

*Primary Examiner* — Jason S Daniels
(74) *Attorney, Agent, or Firm* — Mohr Intellectual Property Law Solutions, PC

(57) ABSTRACT

In one embodiment, a tuck tailgate protector system includes a tailgate protection pad, a compressible anchor, and a strap connecting the anchor to the tailgate protection pad. The compressible anchor may be configured to insert into a gap between a truck tailgate and a truck bed when the tailgate is down. The compressible anchor may also be configured to compress between the truck tailgate and truck bed when the tailgate is up.

20 Claims, 7 Drawing Sheets

TAILGATE PROTECTION PAD SYSTEMS

BACKGROUND

The present disclosure relates generally to systems for protecting truck tailgates. In particular, tailgate protection systems with anchors for placement between the truck tailgate and the truck bed are described.

Tailgate protection pads are currently used to protect truck tailgates from damage, particularly from bicycles that may be placed over the tailgate in the up position, for example with the front wheel placed over the tailgate such that the frame and rear wheel of the bicycle sits in the bed of the truck and the rear wheel of the bicycle protrudes rear-ward from the truck bed.

Known tailgate protection systems are not entirely satisfactory for the range of applications in which they are employed. For example, existing tailgate protection systems either lack straps entirely or require that the user thread the straps through the tailgate hinge, between the tailgate and the truck, thereby making a complete loop around the tailgate. The conventional complete-loop style tailgate protectors provide secure attachment but are difficult and inefficient to remove or install. The conventional strap-free tailgate protectors are easy to install and remove, but are prone to becoming dislodge, especially in high winds or absent one or more bicycles to hold them down.

Thus, there exists a need for tailgate protection pads that improve upon and advance the design of known protection pads. Examples of new and useful tailgate protection pad systems relevant to the needs existing in the field are discussed below.

The present disclosure is directed to tailgate protection pad systems. In one embodiment, a tuck tailgate protector system includes a tailgate protection pad, a compressible anchor, and a strap connecting the anchor to the tailgate protection pad. The compressible anchor may be configured to insert into a gap between a truck tailgate and a truck bed when the tailgate is down. The compressible anchor may also be configured to compress between the truck tailgate and truck bed when the tailgate is up.

In one embodiment, a tuck tailgate protector system includes a tailgate protection pad, a chock anchor, and a strap connecting the anchor to the tailgate protection pad. The compressible anchor may be configured to insert into a gap between a truck tailgate and a truck bed when the tailgate is down. The chock anchor may also be configured to lodge beneath a short edge surface of tailgate when the tailgate is up.

In one embodiment, the system may include a tension adjuster disposed on the strap. In one embodiment, the tension adjuster may comprise plastic. In one embodiment, the strap may comprise nylon webbing.

In one embodiment, the anchor is a first anchor and the strap is a first strap. The system may further comprise a second compressible anchor, and a second strap connecting the second anchor to the tailgate protection pad.

In one embodiment, the anchor comprises a high density foam material. In one embodiment, the tailgate protection pad comprises one or more magnets.

DETAILED DESCRIPTION

Figure 1:
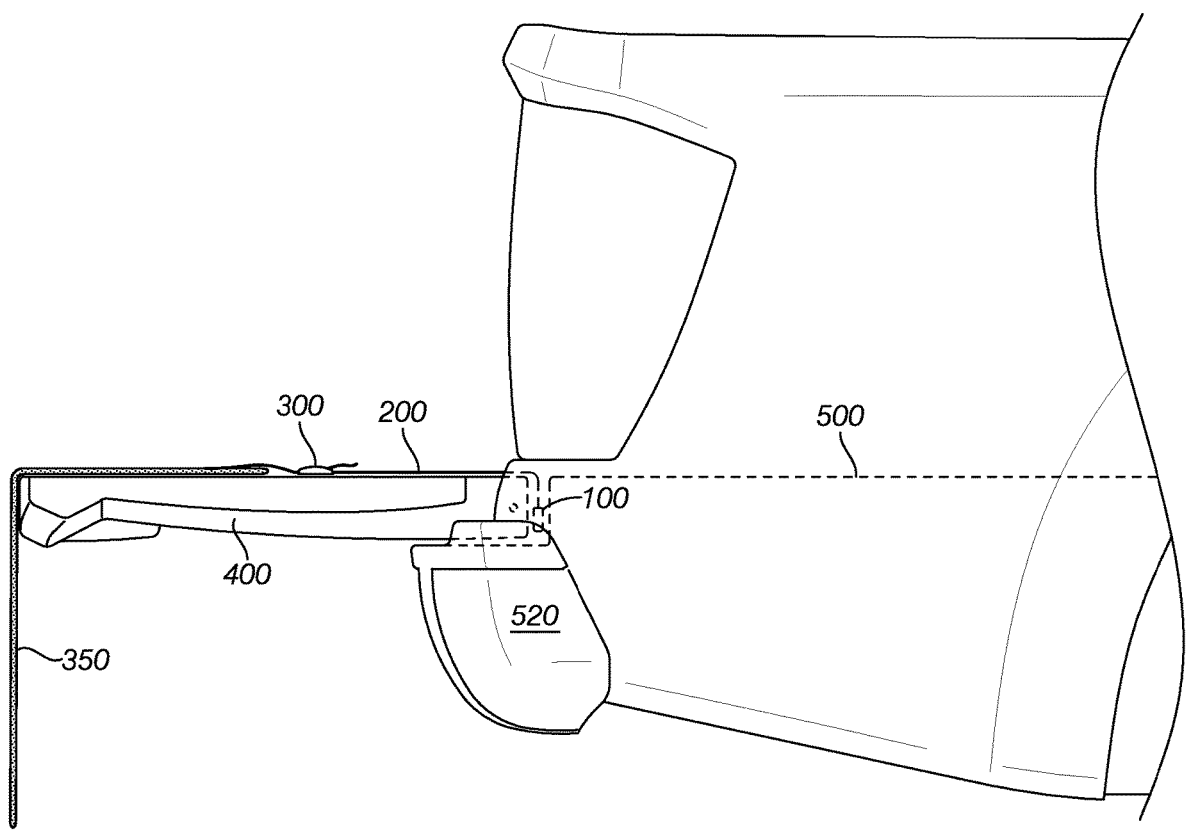
FIG. 1 is a side elevation view of a first example of a tailgate protection pad system, showing the tailgate down.

The disclosed tailgate protection pad systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various tailgate protection pad systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-5, a first example of a tailgate protection pad system, system 10, will now be described. System 10 functions to protect the tailgate from dents and scratches, especially when one or more bicycles are placed over the tailgate. The reader will appreciate from the figures and description below that system 10 addresses shortcomings of conventional tailgate protectors.

For example, system 10 allows the user to quickly and easily secure the protection pad to the truck without the having to thread any straps all the way through the tailgate hinge. System 10 combines the ease of use of strap-free systems with the secure attachment of conventional strap systems.

System 10 includes a tailgate protection pad 350, an anchor 100, and a strap 200 connecting the anchor 100 to the tailgate protection pad 350. The compressible anchor 100 may be configured to insert into a gap between a truck tailgate 400 and a truck bed 500 when the tailgate 400 is down. In some embodiments, the anchor 100 may be configured to compress between the truck tailgate 400 and truck bed 500 when the tailgate is up. In other embodiments, the anchor may be configured to lodge beneath a short edge surface of tailgate when the tailgate is up.

As can be seen in FIG. 1, system 10 may further include a strap tension adjustor 300 between the anchor 100 and the pad 350. With the tailgate 400 in a down position, as shown in FIG. 1, the anchor 100 may be placed by the user into a gap between the tailgate 400 and the truck bed 500. The truck may include bumper 520.

Figure 2:
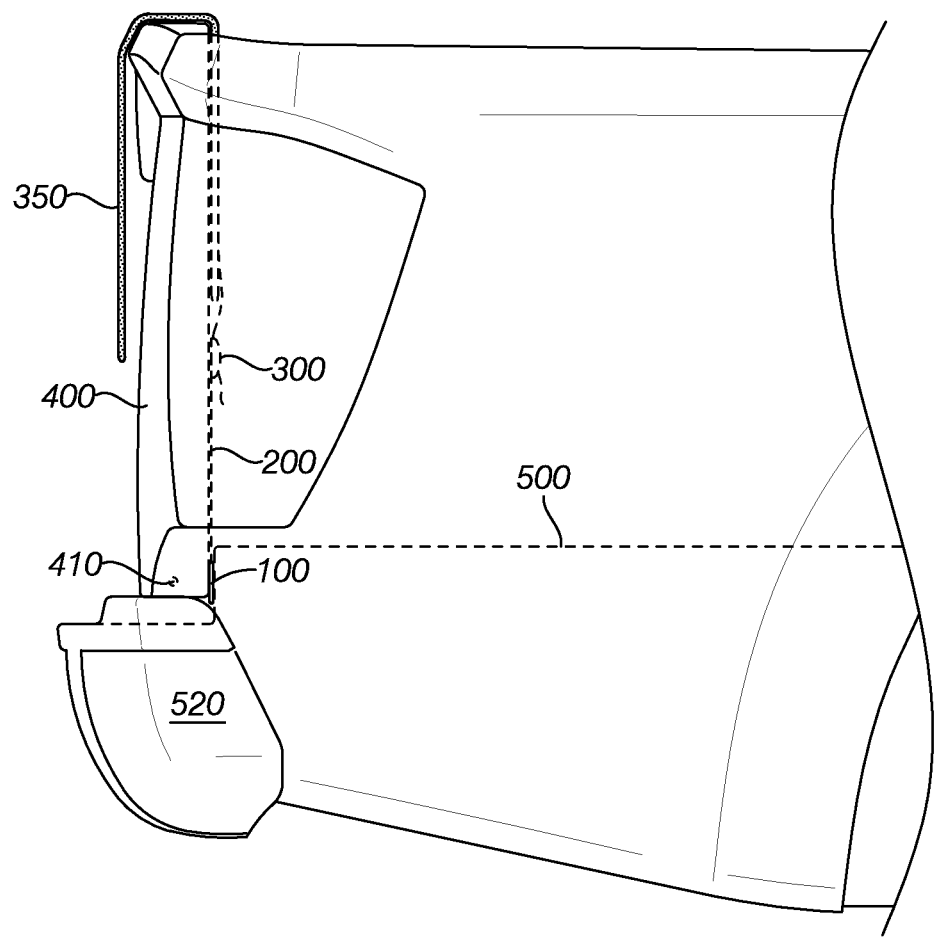
FIG. 2 is a side elevation view tailgate protection pad system shown in FIG. 1, showing the tailgate up.

Turning now to FIG. 2, with the tailgate in an up position, as shown, the compressible anchor 100 may be compressed between the tailgate 400 and the truck bed 500. This compression of the anchor 100 may serve to secure the strap 200 to the truck. The user may then take any slack out of strap 200 via tension adjuster 300.

In some examples the protection pad may include on or more magnets. For example one or more magnets may be disposed proximal the bottom edge of the protection pad, opposite the edge to which the straps are attached. These magnets may serve to keep the bottom edge of the protection pad from flapping in the wind when the protection pad is installed and the truck is moving.

Figure 3:
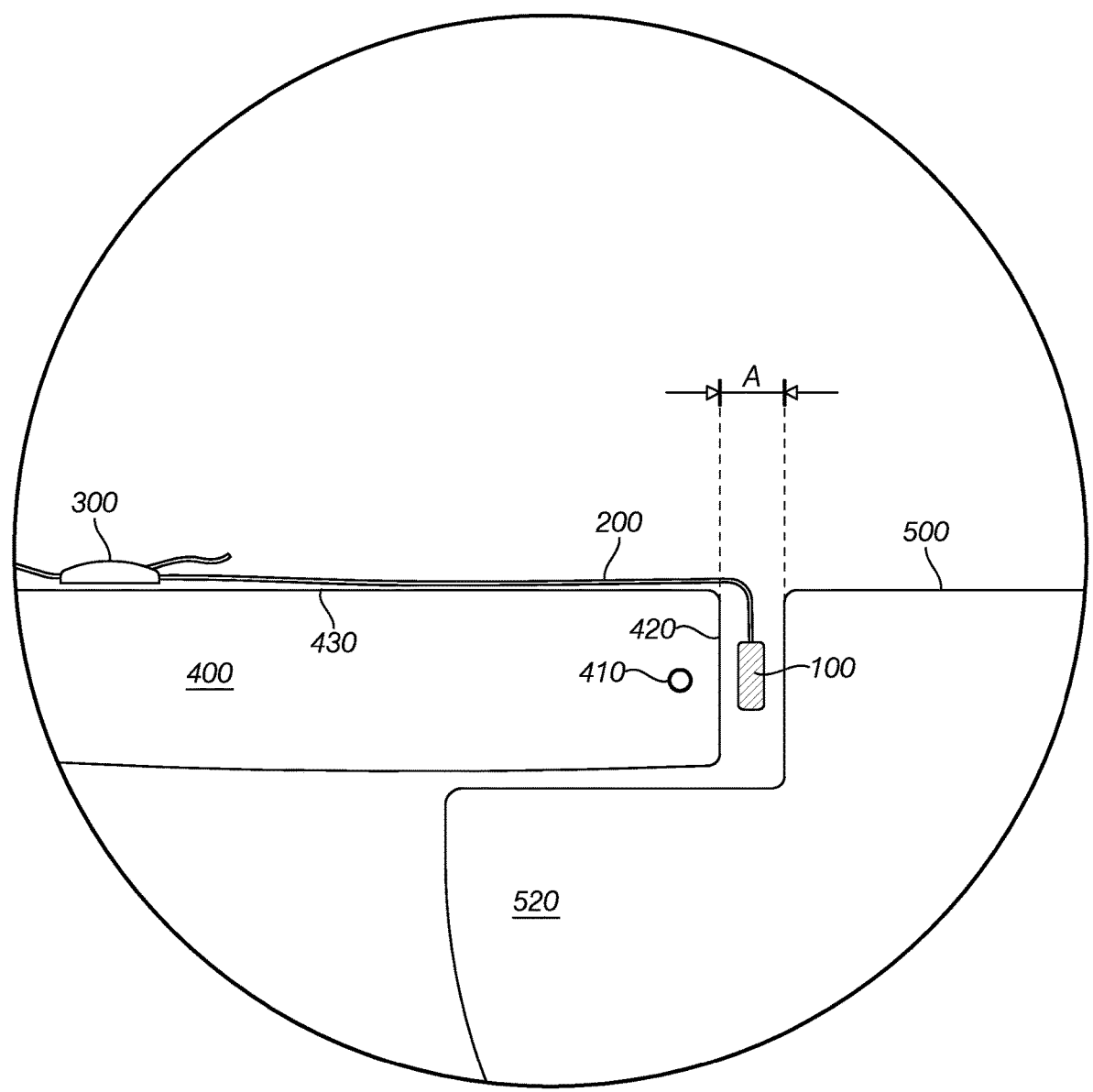
FIG. 3 is a detail view of a first embodiment of an anchor, a compressible anchor, in place between the tailgate and the bed of the truck, with the tailgate down.

Turning now to FIG. 3, a detail view of the compressible anchor 100 in place between the tailgate 400 and the bed of the truck 500 is shown, with the tailgate 400 in a down position. As can be seen, the gap between the bottom edge 420 of tailgate 400 and the truck bed 500 has width A. The compressible anchor 100 may be configured to have a width of less than A, allowing a user to drape the pad 350 over the tailgate and easily slide the compressible anchor 100 into the gap. The user may then put tailgate 400 to an up position.

Figure 4:
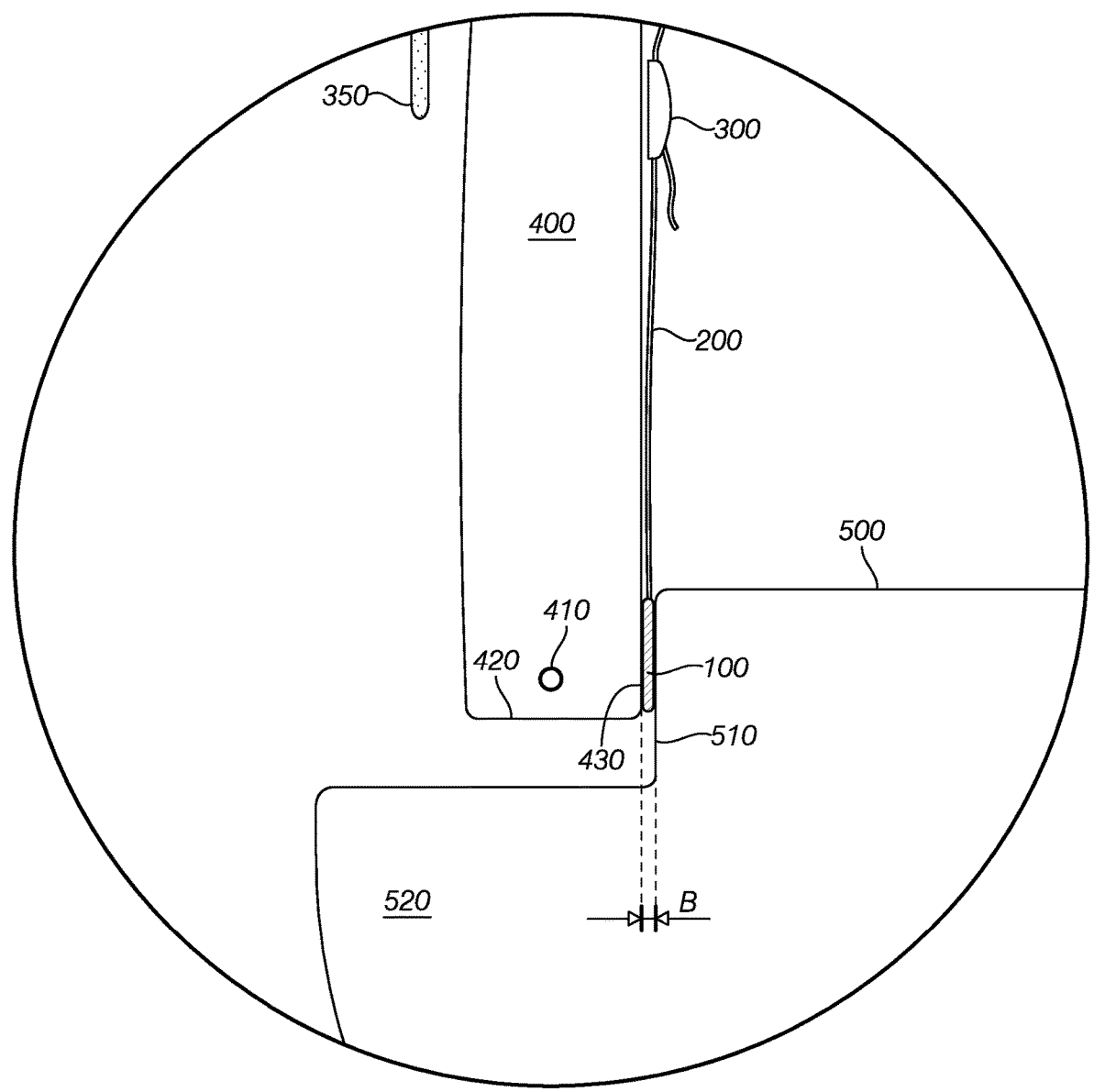
FIG. 4 is a detail view of the compressible anchor of FIG. 3, showing the anchor in place between the tailgate and the bed of the truck, with the tailgate up.

Turning to FIG. 4, once the tailgate has been put up, the compressible anchor 100 is compressed between a side edge 430 of tailgate 400 and the edge 510 of the truck bed 500. As can been seen, due to the placement of tailgate pivot 410, the gap between the tailgate 400 and the truck bed 500 has width B. Width B may be significantly less than width A. Compressible anchor 100 may be configured to have a uncompressed width greater than width B, such that when the tailgate 400 is raised to the up position, the compressible anchor is compressed between a side edge 430 of tailgate 400 and the edge 510 of the truck bed 500. This compression may be so significant as to prevent the strap from being dislodged from the gap, so long and the tailgate remains in the up position.

Figure 5:
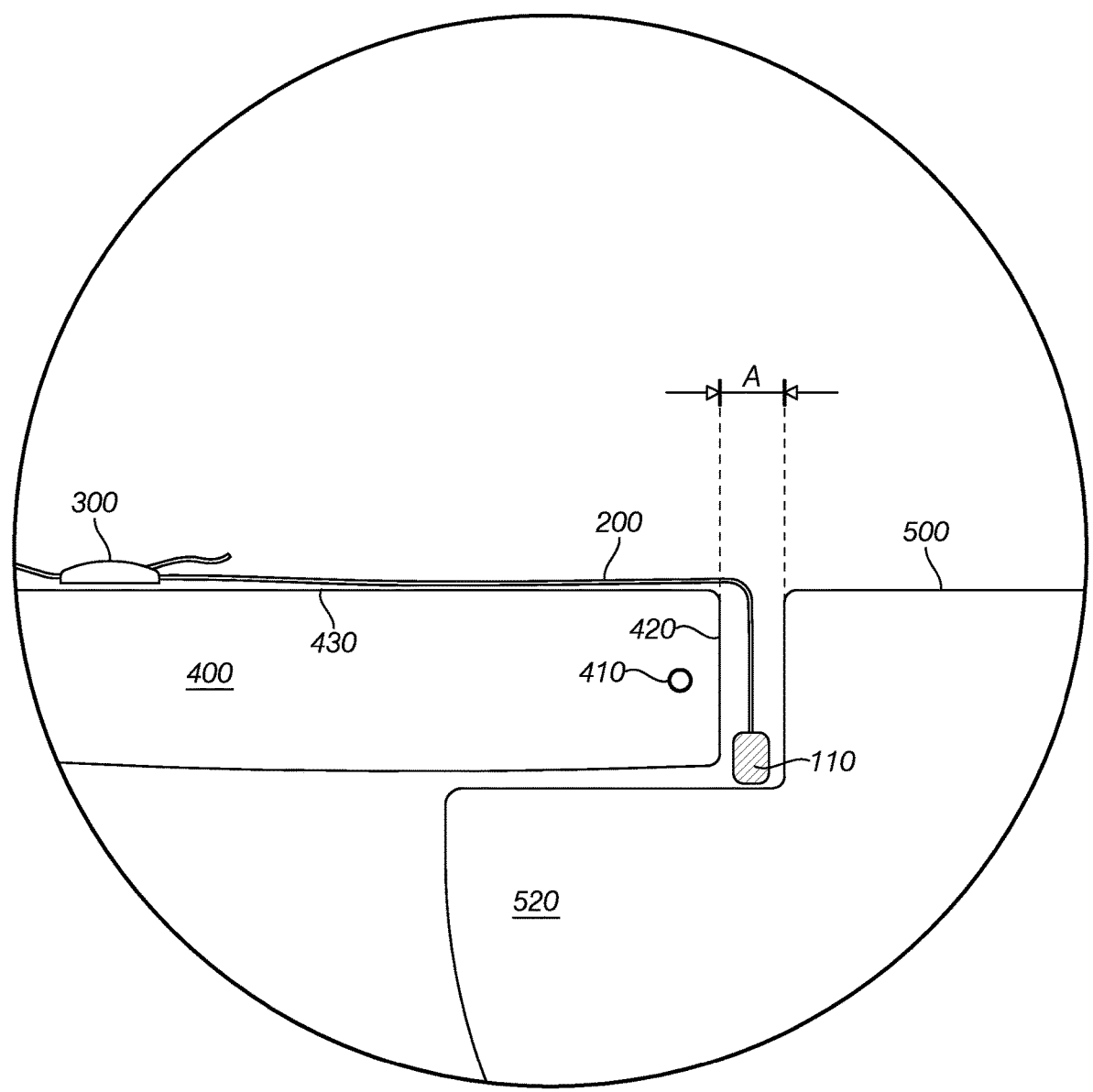
FIG. 5 is a detail view of a second embodiment of an anchor, a chock anchor, in place between the tailgate and the bed of the truck, with the tailgate down.
Figure 6:
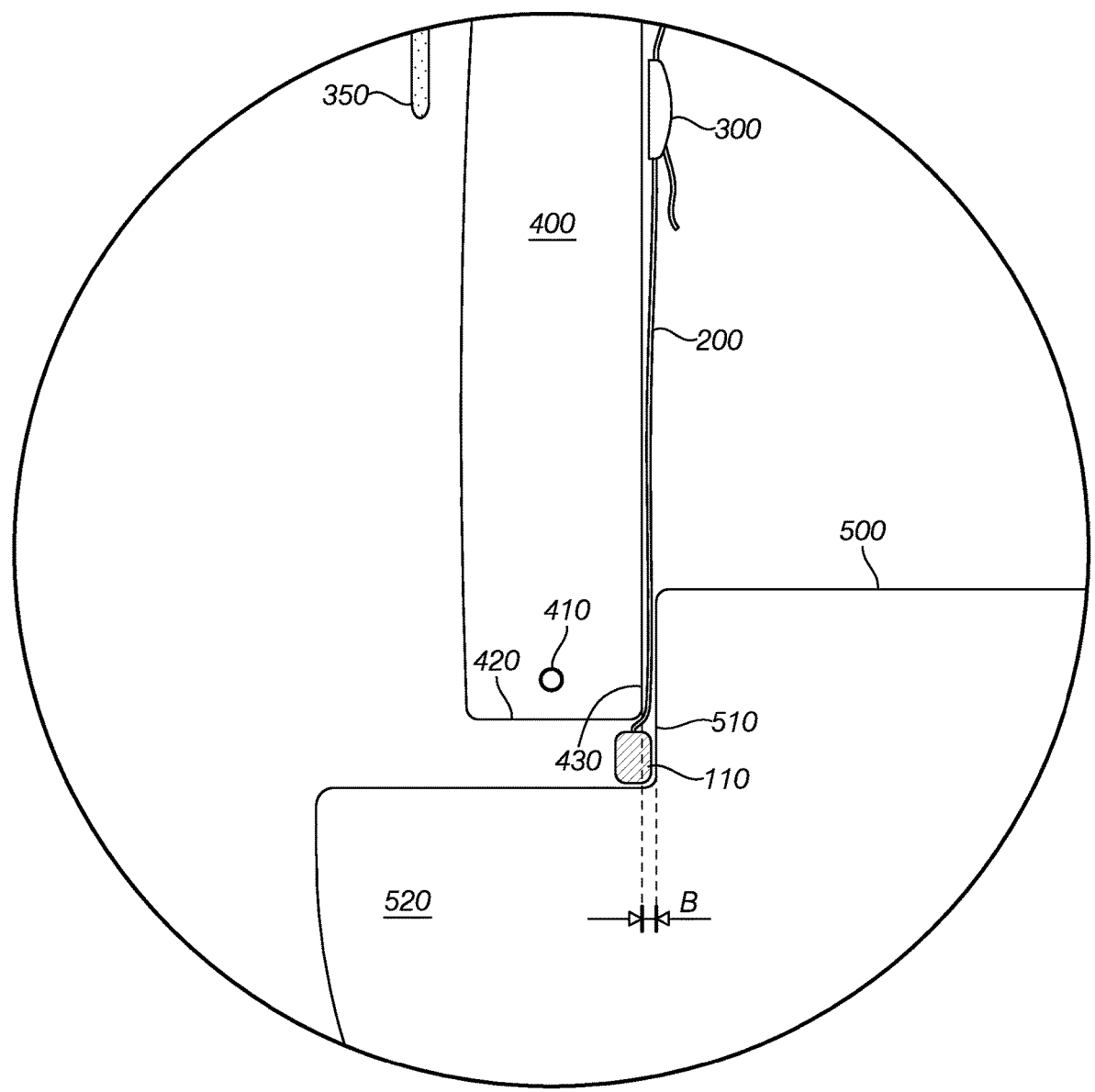
FIG. 6 is a detail view of the chock anchor of anchor of FIG. 5, showing the anchor in place between the tailgate and the bed of the truck, with the tailgate up.

Turning now to FIGS. 5-6, a second embodiment of an anchor, chock anchor 110, is shown. As shown in FIG. 5, the compressible anchor 110 may be placed between the tailgate 400 and the bed of the truck 500, with the tailgate 400 in a down position. As can be seen, the gap between the bottom edge 420 of tailgate 400 and the truck bed 500 has width A. The chock anchor 110 may be configured to have a width of less than A, allowing a user to drape the pad 350 over the tailgate and easily slide the chock anchor 110 into the gap. The user may then put tailgate 400 to an up position.

Turning to FIG. 6, once the tailgate has been put up, the chock anchor 110 is lodged beneath between a bottom edge 420 of tailgate 400 and the edge 510 of the truck bed 500. As can been seen, due to the placement of tailgate pivot 410, the gap between the tailgate 400 and the truck bed 500 has width B. Width B may be significantly less than width A. Chock anchor 110 may be configured to have a width greater than width B, such that when the tailgate 400 is raised to the up position, the chock anchor 110 is lodged beneath a bottom edge 420 of tailgate 400.

Figure 7:
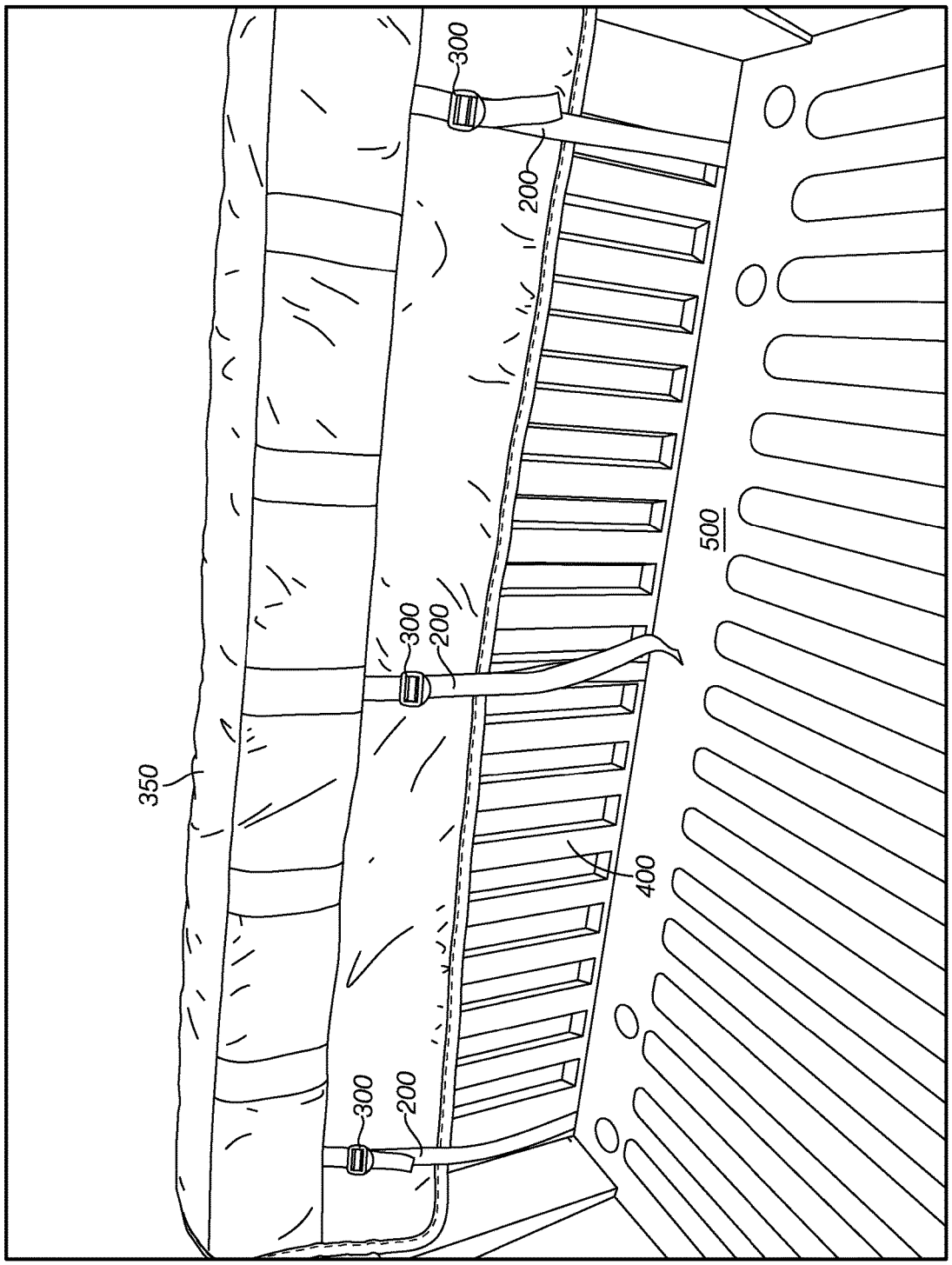
FIG. 7 is a perspective view of the tailgate protection pad system, showing a plurality of straps anchored between the tailgate and the bed of the truck.

Turning now to FIG. 7, one embodiment of the system is shown. In the illustrated embodiment, the system includes three straps 200. In other embodiments, the system may include more or less straps.

In some embodiments, the tension adjuster 300 may be comprised of metal and/or plastic. In some embodiments, the strap 200 may be comprise of nylon webbing or other suitable material. In some embodiments, the pad may be comprised of a nylon cover with synthetic padding.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A truck tailgate protector system, comprising:
   a tailgate protection pad;
   an anchor configured to:
      insert into a gap between a truck tailgate and a truck bed when the tailgate is down; and
      anchor a strap between the truck tailgate and truck bed when the tailgate is up;
   wherein the strap connects the anchor to the tailgate protection pad.

2. The system of claim 1, wherein the anchor is a compressible anchor configured to compress between the truck tailgate and truck bed when the tailgate is up.

3. The system of claim 2, wherein the anchor comprises a high density foam material.

4. The system of claim 1, wherein the anchor is a chock anchor configured to lodge beneath a bottom edge of the tailgate when the tailgate is up.

5. The system of claim 1 comprising a tension adjuster disposed on the strap.

6. The system of claim 5, wherein the tension adjuster comprises plastic.

7. The system of claim 1, wherein the anchor is a first anchor and wherein the strap is a first strap, the system comprising
   a second anchor, and
   a second strap connecting the second anchor to the tailgate protection pad.

8. The system of claim 1, wherein the strap comprises nylon webbing.

9. The system of claim 1, wherein the tailgate protection pad comprises one or more magnets.

10. A truck tailgate protector system, comprising
    a tailgate protection pad;
    a compressible anchor configured to:

insert into a gap between a truck tailgate and a truck bed when the tailgate is down; and compress between the truck tailgate and truck bed when the tailgate is up;

a strap connecting the anchor to the tailgate protection pad; and a tension adjuster disposed on the strap.

11. The system of claim 10, wherein the anchor is a first anchor and wherein the strap is a first strap, the system comprising:

a second compressible anchor, and a second strap connecting the second anchor to the tailgate protection pad.

12. The system of claim 10, wherein the strap comprises nylon webbing.

13. The system of claim 10, wherein the tension adjuster comprises plastic.

14. The system of claim 10, wherein the anchor comprises a high density foam material.

15. The system of claim 10, wherein the tailgate protection pad comprises one or more magnets.

16. A truck tailgate protector system, comprising a tailgate protection pad;

a chock anchor configured to:

insert into a gap between a truck tailgate and a truck bed when the tailgate is down; and configured to lodge beneath a bottom edge of the tailgate when the tailgate is up;

a strap connecting the anchor to the tailgate protection pad; and a tension adjuster disposed on the strap.

17. The system of claim 16 comprising a tension adjuster disposed on the strap.

18. The system of claim 17, wherein the tension adjuster comprises plastic.

19. The system of claim 16, wherein the strap comprises nylon webbing.

20. The system of claim 16, wherein the tailgate protection pad comprises one or more magnets.

\* \* \* \* \*